Dec. 10, 1940.  E. A. CORBIN, JR  2,224,290
AUTOMATIC VALVE LOCKING AND RELEASING DEVICE
Filed Dec. 27, 1938

ELBERT A. CORBIN JR.
INVENTOR.
BY Louis Necho
ATTORNEY.

Patented Dec. 10, 1940

2,224,290

UNITED STATES PATENT OFFICE 2,224,290

AUTOMATIC VALVE LOCKING AND RELEASING DEVICE

Elbert A. Corbin, Jr., Lansdowne, Pa., assignor of one-half to William C. Biddle, Lansdowne, Pa.

Application December 27, 1938, Serial No. 247,834

3 Claims. (Cl. 277—33)

My invention relates to a new and useful automatic valve locking and releasing device particularly adapted for use in connection with two or more interdependent valves, that is, valves which must be opened or closed only on a predetermined order with respect to other valves, whereby certain valves are locked against operation until the proper time has arrived and are then automatically released for operation by the movement or actuation of other valves whereby the preordained order in which all of the valves are to be opened or closed is positively adhered to, not by virtue of the attention or carefulness of the operator, but by virtue of the fact that even a careless or inattentive operator cannot possibly make a mistake since the parts cannot even be moved except in the proper order.

The number of instances in industry in which interdependent valves must be operated in a given, predetermined order are too many to enumerate and hence only one or two particular examples will be referred to. Thus, in the blowing of boilers, for instance, it is necessary, both as a matter of practice and because it is prescribed in the code, that the inboard valve be completely open before the outboard valve is at all moved if all damage to the inboard valve is to be avoided. According to present constructions the operator, through carelessness, inattention, or lack of appreciation of the possible damage, is as likely as not to open the outboard valve partly or fully before opening the inboard valve, or he may fail to open the inboard valve completely before beginning to open the outboard valve thus causing expensive damage. An attempt has been made heretofore to avoid this serious disadvantage and, as far as I am aware, this attempt consisted in enclosing the valve to be opened last in a bag which is locked and the key to which is placed in the office or with the foreman who will only give it to the operator after making sure that the valve to be opened first has been completely opened. The disadvantage of such a practice is obvious.

Another instance may be observed in the piping and valving of the oil industry in which, whether it be for diverting different grades of oil or for interrupting the flow at desired points or for mixing the flow from various predetermined pipes into one common outlet in a given order, it is again necessary to insure the complete opening or complete closing of one or more interdependent valves simultaneously, successively or alternately, and, so far as I am aware, this has heretofore been left entirely to the attention of the operator in charge, and heretofore numerous and costly mistakes have been inevitable and considerable time and labor has been expended constantly in checking the various valves to insure proper operation.

The foregoing instances merely illustrate the scope of the problem which I have solved by my novel construction which will be more clearly understood from the following specification and the accompanying drawing in which.

Figure 1:
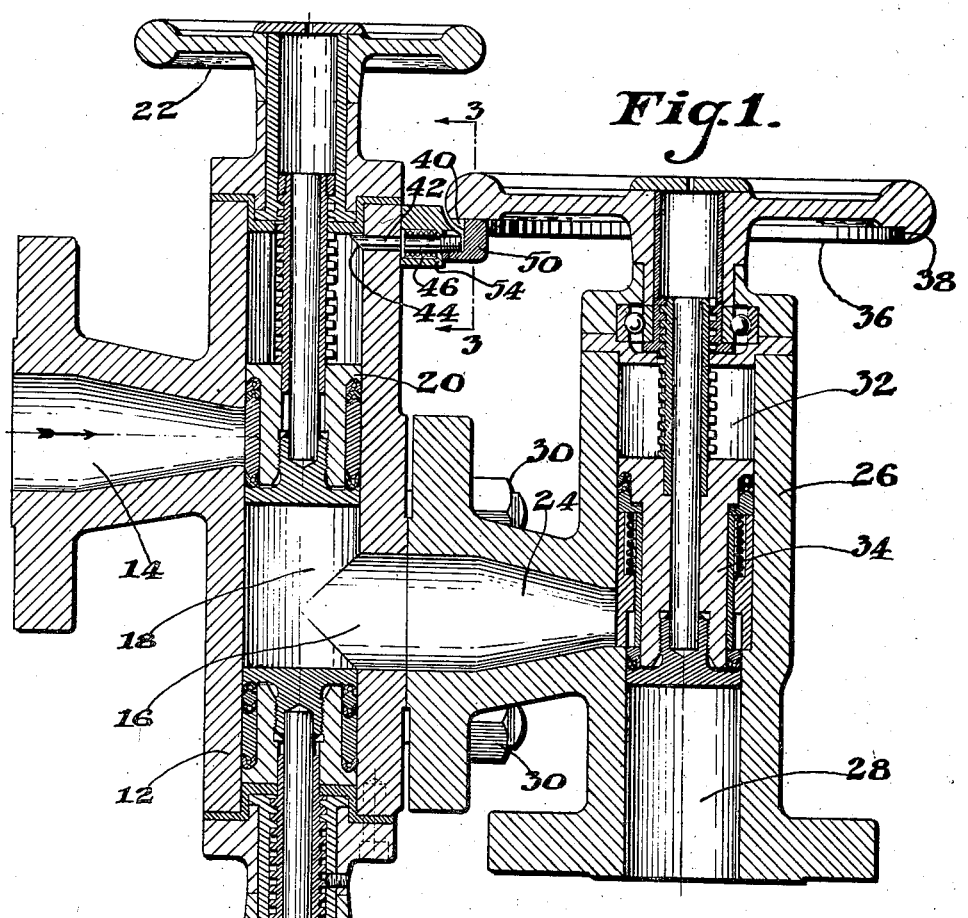
Fig. 1 represents a view in vertical section showing a pair of valves interlocked by the device embodying my invention.
Figure 2:
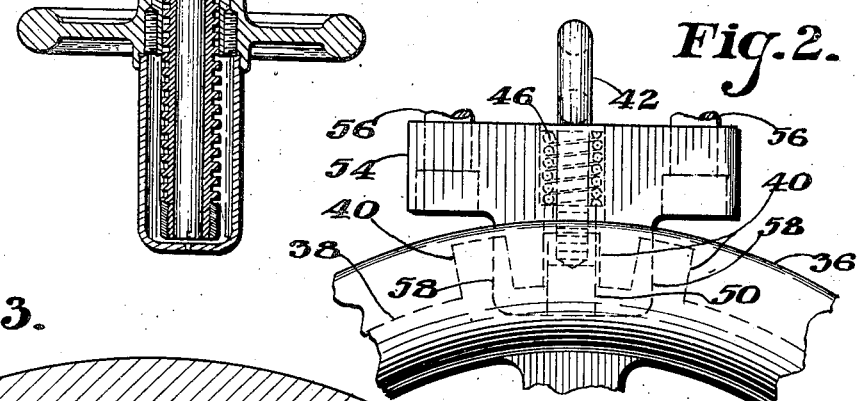
Fig. 2 represents diagrammatically and on an enlarged scale a fragmentary top plan view of the left hand portion of the right hand valve wheel and the latch cooperating therewith, the latter being shown detached from the left hand valve of Fig. 1.
Figure 3:
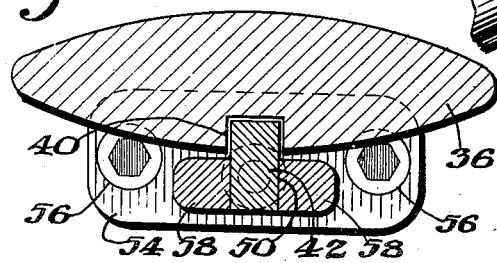
Fig. 3 represents on an enlarged scale a section on line 3—3 of Fig. 1.

Referring to the drawing in which like reference characters indicate like parts and more particularly to Fig. 1, 12 designates a valve body having the inlet 14 and the outlet 16 which communicate with the valve chamber 18. In the valve chamber 18 is disposed a valve piston 20 which is raised and lowered by rotation of the hand wheel 22. The outlet 16 of the valve body 12 registers with the inlet 24 of the valve body 26 which is provided with the outlet 28, the valve bodies 12 and 26 being suitably secured together as by the bolts 30. In the valve chamber 32 of the valve body 26 reciprocates the piston 34 which is operated by the rotation of the hand wheel 36. As far as the purposes of this invention are concerned it is deemed unnecessary to describe the exact details of the mounting or structure of the pistons 20 and 34. In order to prevent the movement of the piston 34 except according to the preordained order which, as shown in Fig. 1, must occur after the actuation of the piston 20, I have provided the hand wheel 36 with a groove 38 which is provided with suitably spaced locking recesses 40 and I have provided a latch 42 which passes through the valve body 12 and which is provided with the cam face 44. The latch 42 is normally pressed inwardly into the valve chamber 18 by the spring 46 so as to project inwardly into the valve chamber as seen in Fig. 1. The outer end of the latch 42 is deflected to form the elbow 50 which is adapted to engage one of the locking recesses 40. With the parts as shown in Fig. 1, that is, with the valve piston 20 in its closing position, the elbow 50 is in engagement with one of the locking recesses 40 and it is impossible to turn the wheel 36 in either direction as long as the valve piston 20 is at any point in the valve chamber 18 below the cam face 44 of the latch 42. Only after the wheel 22 has been turned to lift the valve piston 20 to its uppermost position and thus completely open the left hand valve is it possible to turn the wheel 36 for the reason that the valve piston 20, when it rides upon the cam face 44, pushes the latch 42 outwardly, or to the right as shown in Fig. 1, thus pushing the elbow 50 outwardly from the recess 44 into the annular groove 38, whereupon the wheel 36 is free to turn. From this construction it will be clear that, if it is necessary to open the left hand valve of Fig. 1 before the right hand valve thereof, the operator cannot possibly mistake or neglect the order in which these valves must be turned on and off for the reason that the valve wheel 36 is rigidly locked against rotation until released by the manipulation of the hand wheel 22 which operates the left hand valve. While any suitable means for mounting or assembling the latch 42 in position can be used, I prefer to use the bracket 54 which is suitably secured to the valve body 12 by the bolts or the like 56. Also, in order to steady the elbow 50 of the latch 42 against lateral movement, I provide the abutments 58 which are preferably extensions of the body of the bracket 54.

It will be seen from all of the foregoing that I have devised a novel construction whereby I am enabled positively to control the manipulation of various valves designed for various purposes to which, nevertheless, must be coordinated in action for proper results, and that my novel construction possesses extreme flexibility in that it is applicable to an unlimited number of valves acting in the same or in different ways.

Having thus described my invention, what I claim as new and desire to secure by Letters Patent is:

1. A pair of adjacent valves each containing a piston and each controlling one end of a common intermediate conduit, a pair of actuating mechanisms for operating the respective pistons of said valves, a latch member carried by the piston chamber of one of said valves with one end of said latch member projecting inwardly into said piston chamber and lying in the path of the piston in said chamber and the other end of said latch member projecting beyond said piston chamber and disposed adjacent the actuating mechanism of the other of said pistons, and means for normally urging said latch member into engagement with said last mentioned actuating mechanism and inwardly into said piston chamber, said latch member being adapted to be disengaged from said last mentioned actuating mechanism when it is displaced outwardly with respect to said piston chamber by the action of the piston against the end of said latch member in said piston chamber.

2. A pair of valves each containing a piston and each controlling one end of a common intermediate conduit, and means for normally locking one of said valves in its closed position until the other valve has been opened and for automatically releasing the first said valve, comprising a latch member carried by the piston chamber of one of said valves with the inner end of said latch member projecting into said piston chamber and in the path of the piston operating therein and the outer end of said latch member projecting beyond said piston chamber, a hand wheel for operating the piston of the first of said valves, a notch formed in said wheel and a spring for normally urging said latch member into engagement with said notch and inwardly into said piston chamber and into the path of the piston operating therein, said latch member being adapted to be disengaged from said notch against the pressure of said spring when said latch member is displaced outwardly with respect to said piston chamber by the action of the piston in said piston chamber against the inner end of said latch member.

3. A pair of valves each containing a piston and each controlling one end of a common intermediate conduit, and means for normally locking one of said valves in its closed position until the other valve has been opened and for automatically releasing the first said valve, comprising a latch member carried by the piston chamber of one of said valves with the inner end of said latch member projecting into said piston chamber and in the path of the piston operating therein and the outer end of said latch member projecting beyond said piston chamber, a hand wheel for operating the piston of the first of said valves, a plurality of notches formed in said wheel and a spring for normally urging said latch member into engagement with said notches and inwardly into said piston chamber and into the path of the piston operating therein, said latch member being adapted to be disengaged from said notches against the pressure of said spring when said latch member is displaced outwardly with respect to said piston chamber by the action of the piston in said piston chamber against the inner end of said latch member.

ELBERT A. CORBIN, Jr.